H. L. BROWN.

Hand-Cars.

No. 5,273. Reissued Feb. 11, 1873.

WITNESSES.
H. K. Duhamel
Alex S. Davidson

INVENTOR.
Henry L. Brown
Per H. S. Abbot Atty

AM. PHOTO-LITHOGRAPHIC CO. N.Y. (OSBORNE'S PROCESS.)

UNITED STATES PATENT OFFICE

HENRY L. BROWN, OF ADRIAN, MICHIGAN.

IMPROVEMENT IN HAND-CARS.

Specification forming part of Letters Patent No. 94,469, dated September 7, 1869; reissue No. 5,273, dated February 11, 1873.

DIVISION A.

*To all whom it may concern:*

Be it known that I, HENRY L. BROWN, of Adrian, in the county of Lenawee and State of Michigan, have invented a new and useful Improvement in Hand-Cars for Railroads; and I do hereby declare that the following is a true and accurate description thereof, reference being had to the accompanying drawing and to the letters of reference marked thereon and being a part of this specification.

Figure 1:
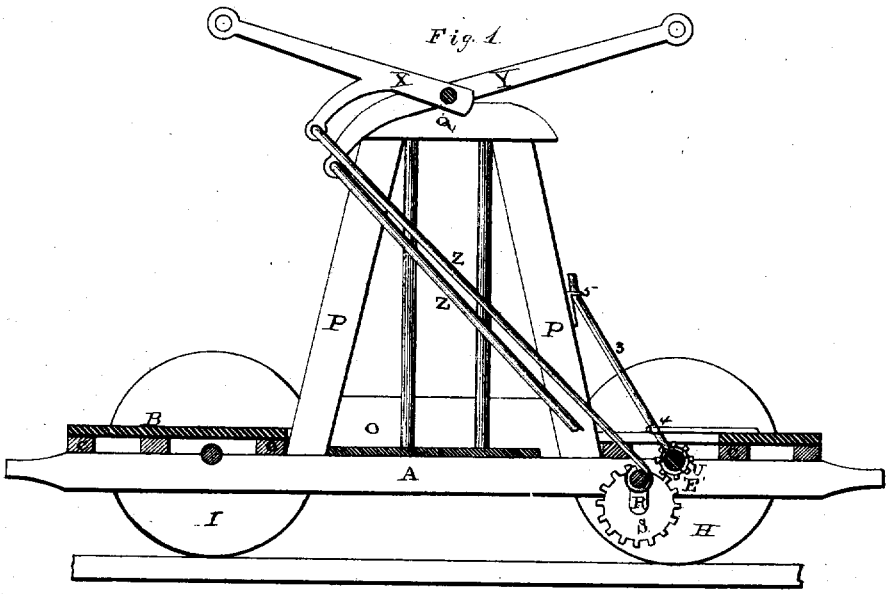
Figure 2:
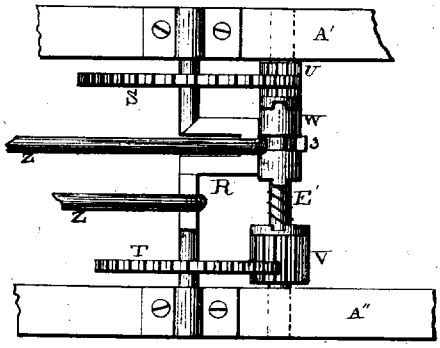

Figure 1 is a section view of my hand-car; and Fig. 2 is an enlarged view of the driving mechanism.

Like letters indicate like parts in each figure.

The nature of this invention relates to improvements in the construction of what are usually denominated as "hand-cars," so that greater speed may be attained in running with the wind, by means of a peculiar arrangement of sliding pinions connected with the driving-shaft, and fixed pinions on an additional crank-shaft, whereby a large pinion on the driving-shaft is made to engage a small one on the crank-shaft, and vice versa.

A in the drawing represents the plates or bed-timbers of the frame running longitudinally, and somewhat longer at each end than the floor or platform B, and said ends formed into suitable handles, by means of which the car can be readily lifted from the track. C are transverse timbers securely fastened to the plates A, and upon which the floor or platform is laid. H are ordinary car-wheels rigidly secured to the axles in the usual manner, while I is a similar wheel sleeved upon the rear axle so as to revolve upon it, and is so attached to assist in the more easily removing the car from the track. O is a well or receptacle for holding tools, &c., and is built in the center of the car under the gallows-frame P, at the top of which is suitably journaled the rock-shaft. R is a double crank-shaft, properly journaled, and running in suitable boxes secured to the under side of the timbers A′ A″, and provided with a larger and smaller geared wheel, S and T, which mesh into and give motion to the larger and smaller pinions U and V, which are loosely sleeved upon the axle E′ between the timbers A′ A″. W is a double clutch loosely sleeved upon said axle in such a manner that it will move horizontally upon said axle. This clutch is provided with a slot, which engages with a spur or projection upon the axle, by means of which said clutch is made to revolve with and in the same direction with said axle.

Motion is communicated to said double crank-shaft by the levers X and Y, provided with suitable handle and connecting-rods Z. The levers are secured to the rock-shaft.

A bifurcated rod, 3, fulcrumed at 4, is used to throw either side of the clutch into connection with either of the pinions U and V, as desired, the upper end of said rod being secured in the desired position by engaging with the rack 5, which is secured to the front of the gallows-frame.

The operation of my invention is as follows: The levers X and Y being operated cause the double crank-shaft R, with its pinions S and T, to revolve, and, by so shifting the double clutch W as to cause the large pinion S to engage with the small pinion U, a rapid rotation will be given to the axle; while, if a slower motion is desired with the same motion of the crank-shaft, the clutch is again shifted, so as to cause the small pinion T to engage with the large pinion V.

What I claim as my invention, and desire to secure by Letters Patent, is—

1. In a hand-car, a double crank-shaft carrying two driving-wheels of unequal size, in combination with the pinions and double clutch arranged upon the axle, substantially as set forth.

2. In a hand-car, the combination of a double crank carrying two driving-wheels of unequal size with suitable mechanism on the axle, so that the speed can be changed at will, substantially as set forth.

In testimony that I claim the foregoing as my invention, I hereunto affix my signature this 17th day of December, 1872.

HENRY L. BROWN.

Witnesses:

H. B. RICE,

LUCIUS L. FORD.